June 14, 1932.  R. C. PIERCE  1,863,252
OUTLET VALVE
Filed May 27, 1931  2 Sheets-Sheet 2

Inventor:
Raymond C. Pierce,
By Dyrenforth, Lee, Chritton & Wiles,
Attorneys.

Patented June 14, 1932

1,863,252

UNITED STATES PATENT OFFICE

RAYMOND C. PIERCE, OF CHICAGO, ILLINOIS, ASSIGNOR TO GENERAL AMERICAN TANK CAR CORPORATION, A CORPORATION OF WEST VIRGINIA

OUTLET VALVE

Application filed May 27, 1931. Serial No. 540,441.

My invention relates more particularly, though not exclusively, to bottom outlet valve mechanism for tank cars. The problem of providing a satisfactory outlet valve is complicated by reason of the fact that this type of valve is located in the bottom of a steel tank and must handle not only dirty liquids, but also considerable quantities of iron rust and various sediments, as well as foreign objects such as broken rivets, which may happen to be in the tank.

A metal to metal contact between valve and seat as provided where the seat bearing area of the valve is made wholly of metal is not satisfactory as the valve cannot be tightly seated to perform its closure function when dirt or scale becomes lodged between the valve and seat, it being manifest that if the valve mechanism is so constructed that the workmen may exert sufficient force on the valve to crush these foreign particles the valve is likely to become damaged.

The disadvantages above noted may be overcome by making the seating portion of the valve wholly of resilient material, such as rubber, which permits of a tight closure being effected because of its resilient nature, enabling it to deform around the foreign particles on the seat. However, such a valve would not be satisfactory as the resilient material is susceptible to damage when contacted by acids or alkalis and may be consumed by fire, in any of which events the valve would cease to function as a closure.

One of my objects is to provide a valve whereby the lodging of foreign particles on the seat will not prevent the tight closing of the valve and damage to the valve will be avoided.

Another object is to provide a valve capable of accomplishing the object above referred to and which will afford multiple seats whereby should one seat provided by the valve fail to hold, another seat may be tight.

Another object is to provide a valve which will present the advantages of a valve the seat engaging portion of which is made entirely of metal and also of a valve the seat engaging portion of which is entirely of resilient material, without the disadvantages thereof.

Another object is to provide in a valve structure comprising a removable seat with which the valve cooperates and means engaging projections on the seat and holding the latter in place, for the reduction of the amount of metal forming the projections, greater ease of removal of the valve seat when desired, and minimum obstruction to the free draining of the contents of the tank through the outlet; and other objects as will be manifest from the following description.

Referring to the accompanying drawings.

Figure 1:
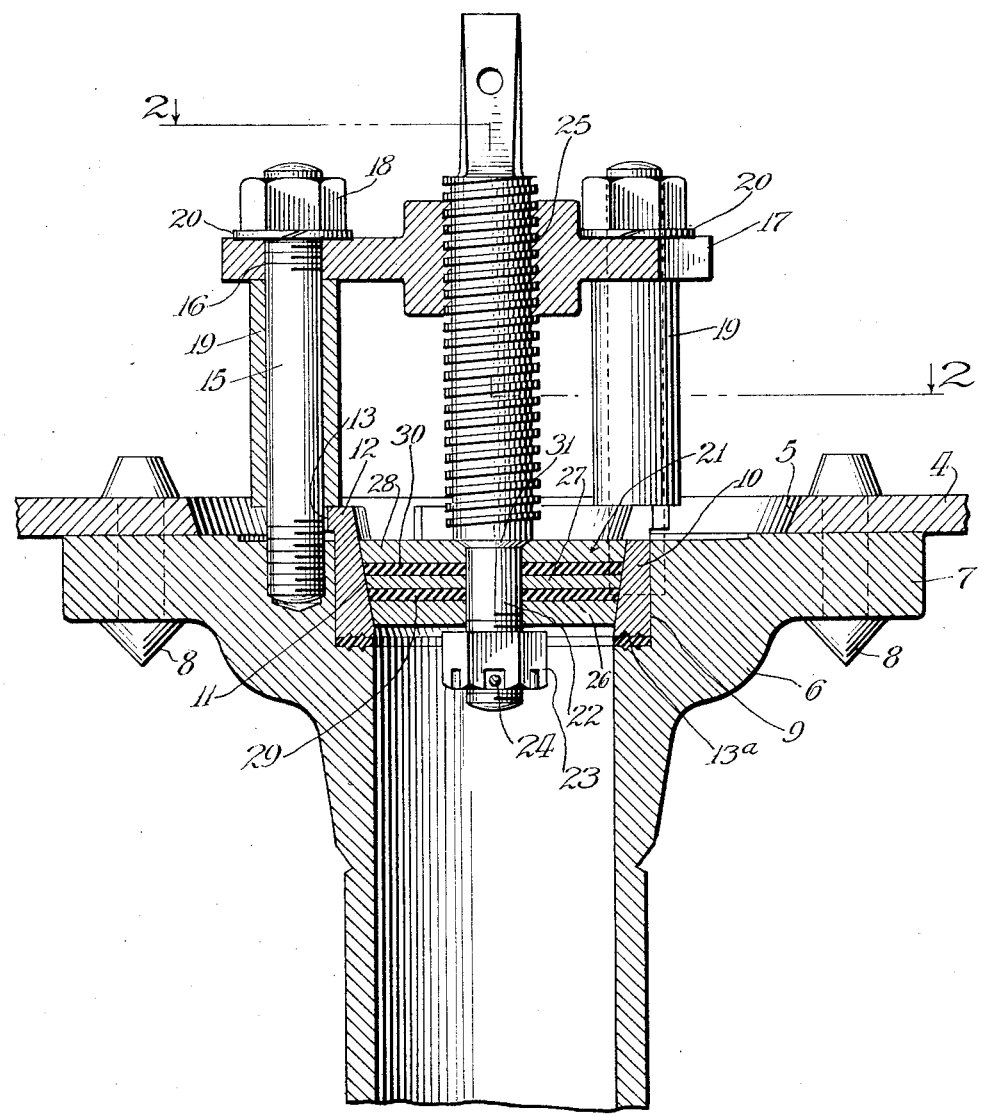
Figure 1 is a view in vertical sectional elevation of the outlet portion of a tank of a tank car showing it equipped with a valve constructed in accordance with my invention, this view being taken at the irregular line 1—1 on Fig. 2 and viewed in the direction of the arrows.
Figure 2:
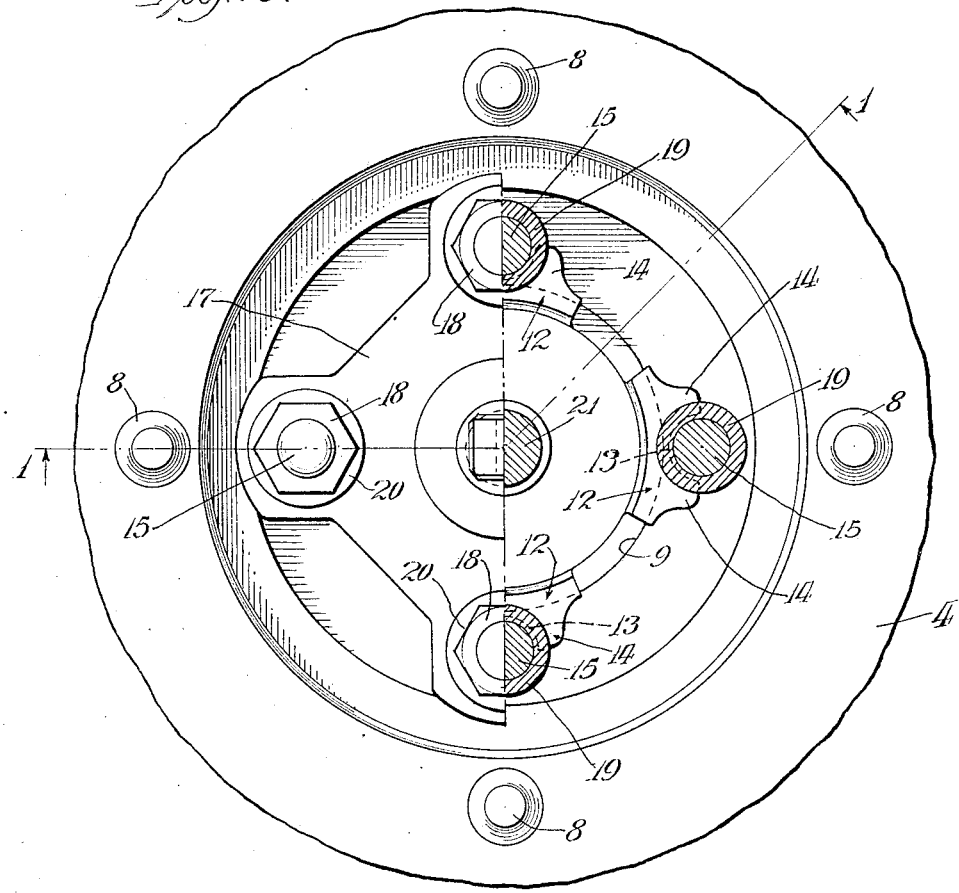
Figure 2 is a plan sectional view taken at the irregular line 2—2 on Fig. 1 and viewed in the direction of the arrows.

In the particular construction shown 4 represents the bottom sheet of a tank car containing an opening 5 at which the valve-equipped tank-outlet member hereinafter described is located.

Fitting flatwise at its upper surface against the underside of the bottom sheet 4 to extend entirely across the opening 5, is the tank-outlet member 6 above referred to and in the form of an outlet-leg shown as formed with an annular flange portion 7 which underlaps the annular wall portion of the opening 5 and to which it is rigidly secured as by rivets 8 to form a tight joint.

The outlet leg 6 contains in its upper surface an annular recess 9 concentric with the opening through the leg to receive a removable and replaceable ring-like member 10 presenting an upwardly flaring seat 11 for cooperating with the valve hereinafter described, the seat member 10 being provided about its periphery with radiating ears 12 containing radially outwardly opening recesses 13 flanked by arms 14. A gasket 13ᵃ located in the bottom of the recess 13 serves to prevent possibility of leakage between the member 10 and the outlet leg.

Screwed at their lower ends into the flange 7 of the member 6 and grouped around the center of the latter is a series of studs 15 which extend upwardly through openings 16 in a cross-member 17 and are provided at their upper threaded ends with nuts 18, sleeve-bushings 19 surrounding the studs 15 and being located between the ears 12 and the cross member 17.

The seat-member 10 is firmly held in seated position in the recess 9 by tightening the nuts 18 against the cross member 17, lockwashers 20 being interposed therebetween, which forces the bushings against the upper surfaces of the ears 12.

In this connection is may be stated that by reason of the assembly just described it is possible to employ the ears 12 which do not encircle the studs 15, with the advantage of reducing the metal required and permitting ready removal of the seat member 10 as desired, without subjecting the ears 12 to forces tending to spring the studs 15 outwardly, it being noted that by reason of the relationship of the cross members 17 to the other parts the downward force produced by the nuts 18 and cross member 17 is exerted along those portions of the walls of the bushings 19 which extend adjacent the longitudinal axis of the assembly.

The valve-proper of the device is represented at 21 and is carried on the lower, reduced, end of a stem 22 having a nut 23 at its lower extremity below the valve proper 21 and held against displacement on the stem by a cotter pin 24. The stem 22 above the valve proper 21 is threaded at which portion it screws in a threaded opening 25 in the cross member 17, the upper end of the stem 22, in practice, engaging a rotatably operating rod (not shown) and as commonly provided in tank car constructions, for rotating the valve stem to adjust the valve proper toward and away from the valve seat 11 with which it cooperates.

The valve proper 21 comprises a plurality of disks slidable on the reduced portion of the stem 22, certain of these disks being of metal and the others thereof of resilient material preferably soft vulcanized rubber, the disks of metal alternating with the disks of resilient material. In the particular construction shown, three metal disks, 26, 27 and 28, and two disks 29 and 30 of resilient material, are provided.

The metal disks 26, 27 and 28 are circumferentially beveled to correspond with the angle of the seat 11 and are of such respective diameters that when engaging the seat 11 they extend in spaced apart relation, and the resilient disks 29 and 30 are of such thickness and diameter that when the disks 26, 27 and 28 engage the seat 11 they will be compressed and spread into close engagement at their circumferences with the seat.

By way of example, the disks 29 and 30 may be one-quarter inch thickness and the metal disks 26, 27 and 28 of such respective diameters that in the successive seating of the latter against the seat 11 the disks 29 and 30 will be compressed about one-sixteenth of an inch.

It is preferred that in the making of the disks 26, 27 and 28 they be slipped onto an arbor (not shown) and spaced apart by three-sixteenths inch thick metal washers, and these disks then machined, by turning them down, to the same taper as that of the seat 11.

Figure 3:
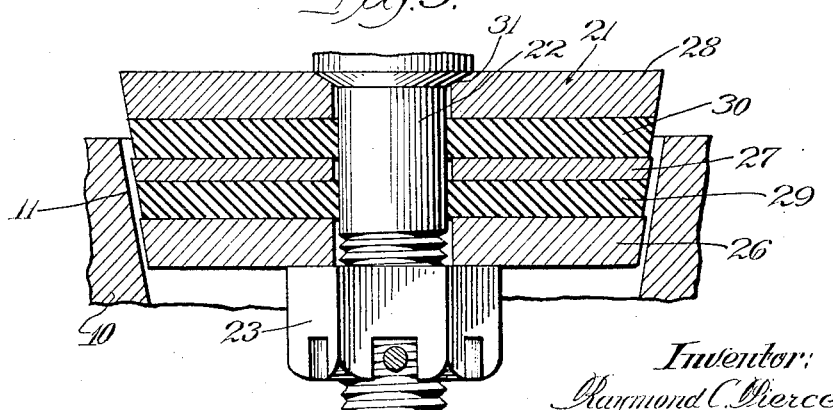
Figure 3, a view in sectional elevation of the valve and seat showing the positions occupied by the multiple seating portions of the valve before seating pressure is applied to the valve.

After assembly of the disks 26 to 30, inclusive, in alternation, on the valve stem 22 to extend between a shoulder 31 thereon and the nut 23 as shown in Fig. 3, in which condition the disks 29 and 30 are uncompressed, and assembling the valve stem with the cross member 17, turning of the valve stem in a direction to move the valve proper toward the seat 11 first contacts the disk 26 with this seat in which condition the disks 29 and 30 are uncompressed. On continuing the turning of the stem pressure is applied to the valve proper through the shoulder 31 bearing down on the upper metal disk 28 thereby compressing the resilient disks 29 and 30 and spreading them outwardly toward the seat 11 and inwardly toward the stem. As the disk 29 normally extends closer than the disk 30 to the seat 11 the disk 29 will next become engaged, in compressed condition, with the seat 11 and when turning force on the stem is continued the disks 27, 30 and 28 will be forced in succession and with great pressure against the seat 11.

Ordinarily with normal closure of the valve, only the metal disk 26 and the resilient disk 29 will be in engagement with the seat 11 which allows a reserve of two metal disks and one resilient disk to take up for wear and for action in case of valve leakage.

It will be understood that the pressure exerted by the shoulder 31 on the upper disk 28 is sufficiently great to present the minimum danger of leakage at this joint. Should, however, this joint not be sufficiently tight to prevent leakage, discharge of liquid therethrough will be prevented because of the tight joints between the resilient disks 29 and 30 and the valve stem 22, produced by the great pressure of these resilient disks against the stem.

When the valve parts are first assembled the nut 23 is slightly tightened and locked by the cotter pin 24 to permit of the grinding of the valve in the rotation thereof to seating position, this being accomplished as follows: In the screwing down of the valve the disk 26 rotates against the seat 11 due to the friction between the various disks and between the disks and the valve stem 22, until the friction between the disk 26 and the seat 11 overcomes the frictional engagement between the parts by which the disk 26 is rotated. The metal disks 27 and 28 still being out of contact with the seat 11 continue to rotate until the friction between these disks and the seat 11, in succession, reaches a degree exceeding the force tending to rotate them. Thus each time the valve proper is seated on the seat 11 the portions of the seat engaged by the metal disk, or disks, as the case may be, of the valve proper, are ground to maintain these portions clean.

It is desirable that the valve, when in closed condition, be locked against the seat 11 to prevent vibration and secure high pressure closure, this being effected by so shaping the seat 11 that it extends at a steep angle to the longitudinal axis of the valve. To permit of the so shaping of the seat 11 and to prevent sticking of the valve, the disks 26, 27 and 28 and the seat 11 are made of different kinds of noncorrosive metal, the seat 11, by way of example, being made of bronze and the disks 26, 27 and 28 of stainless steel having a chromium content of about 12% to 14%. The resilient disks 29 and 30 also augment the locking of the valve proper against the seat 11 which aids in the prevention of vibration of the valve proper.

Should foreign particles become lodged between the resilient disks 29 and 30 and the seat 11 the material of these disks will form about the particles and become closely engaged with the seat 11 to prevent leakage, it being noted that the provision of the metal disks as described prevent, in the seating of the valve, the exertion of undue compression forces against the rubber and thus avoids damage thereto.

While my improved valve affords the advantages of a valve constructed of resilient material, the disadvantages resulting from the corroding of the resilient material by acids or alkalis and destruction by fire are avoided, as the metal disks provided as parts of the valve proper as described insure against the loss of the lading.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

The combination of a tank having an opening in its bottom, a member in said opening having a valve seat, studs extending upwardly around said opening, ears projecting outwardly from said member and containing laterally recessed portions through which said studs extend, a cross member through which said studs extend, bushings surrounding said studs, and means engaging said studs for forcing said cross member against the upper ends of said bushings and the latter against the upper surfaces of said ears.

RAYMOND C. PIERCE.